(12) United States Patent
Seungpyo

(10) Patent No.: US 6,878,082 B2
(45) Date of Patent: Apr. 12, 2005

(54) HYDRAULIC TENSIONER WITH RATCHET MECHANISM

(75) Inventor: Shin Seungpyo, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 115 days.

(21) Appl. No.: 10/320,256

(22) Filed: Dec. 16, 2002

(65) Prior Publication Data

US 2003/0125143 A1 Jul. 3, 2003

(30) Foreign Application Priority Data

Dec. 28, 2001 (JP) ........................................ 2001-399184

(51) Int. Cl.⁷ .............................. F16H 7/08; F16H 7/22
(52) U.S. Cl. ...................................... 474/109; 474/110
(58) Field of Search ........................ 474/109–111, 140, 474/101, 133, 136

(56) References Cited

U.S. PATENT DOCUMENTS

| | | | | |
|---|---|---|---|---|
| 5,304,099 A | * | 4/1994 | Deppe et al. | 474/110 |
| 6,045,471 A | * | 4/2000 | Suzuki | 474/109 |
| 6,634,973 B1 | * | 10/2003 | Simpson et al. | 474/109 |

FOREIGN PATENT DOCUMENTS

| | | | | |
|---|---|---|---|---|
| DE | 4431161 | | 3/1995 | ............. F16H/7/08 |
| EP | 1138979 | | 10/2001 | ............. F16H/7/08 |
| EP | (1323948) A1 | * | 7/2003 | ............. F16H/7/08 |
| JP | (09-89057) A | * | 3/1997 | ............. F16H/7/08 |
| JP | 2000-136859 | | 5/2000 | |
| JP | 2001-304360 | | 10/2001 | |

* cited by examiner

Primary Examiner—Marcus Charles
(74) Attorney, Agent, or Firm—Brown & Michaels, PC; Greg Dziegielewski

(57) ABSTRACT

A hydraulic tensioner that applies tension to a chain is comprised of a hollow plunger slidably received in a bore of the housing having an inner space defining a fluid chamber with the bore and a rack member provided slidably in an axial direction in a groove on the outer circumference of the plunger. The hydraulic tensioner further comprises a spring biasing the plunger in a protruding direction, a ratchet member provided slidably in a ratchet hole extending in an inclined direction intersecting an axis of the plunger having cylindrical head portion with an outer circumferential edge portion adapted to engage rack teeth of the rack member, permitting travel of the plunger in a protruding direction but preventing retraction of the plunger in a backward direction, and a coil spring that biases the ratchet member in an engaging direction of the rack teeth.

5 Claims, 7 Drawing Sheets

HYDRAULIC TENSIONER WITH RATCHET MECHANISM

BACKGROUND OF THE INVENTION

1. Field of the Invention

The invention pertains to the field of hydraulic tensioners for imparting an appropriate tension. More particularly, the invention pertains to a hydraulic tensioner having a ratchet mechanism to prevent a plunger's retraction at the time of a decreased hydraulic pressure.

2. Description of Related Art

A hydraulic tensioner generally includes a housing, a hollow plunger that is slidably fitted into a bore formed in the housing that is biased in a protruding direction by a spring, and a fluid chamber defined by the bore of the housing and the plunger. During operation, a force of a chain or belt imparted on a distal end of the plunger balances a resilient force of the spring and the hydraulic force present in the chamber.

A force from a chain is imparted on the distal end of a plunger when an inadequate amount of hydraulic pressure is present in the chamber, such as engine start, the plunger is easily forced to retract into the housing, thereby causing noise or oscillation. In order to prevent such a retraction of a plunger, various kinds of hydraulic tensioners with ratchet mechanisms have been proposed, such as shown in Japanese Patent Application Publication Nos. 2000-136859 and 2001-304360.

The ratchet mechanism shown in the Japanese Patent Application Publication No. 2000-136859 includes a rack that is supported translatably in a longitudinal hole formed in a housing, a ratchet that is fitted slidably in a lateral cavity formed in the housing that has a plurality of teeth adapted to engage the rack, and a spring that is fitted in the cavity that biases the ratchet in such a direction that each tooth of the ratchet engages with the rack.

The ratchet mechanism shown in the Japanese Patent Application Publication No. 2001-304360 includes a rack groove formed on a circumference of a piston, a claw member that has a plurality of teeth adapted to engage the rack groove that is slidably fitted in a lateral cavity, which extends in a direction intersecting an axial center line of the piston in the housing, and a spring that is fitted in the lateral cavity that biases the claw member in such a direction that each tooth of the claw member engages with the rack teeth.

When the force of a chain is applied to the distal end of the plunger of the above prior art ratchet mechanisms the plunger moves in a backward direction, engaging the rack with the teeth of the ratchet or the claw member, preventing the plunger's retraction. However, the mechanisms that achieve this result are complicated in structure.

Therefore, there is a need in the art for a hydraulic tensioner with a ratchet mechanism that is simple in structure and prevents retraction of the plunger when an inadequate amount of hydraulic pressure is present in the chamber.

SUMMARY OF THE INVENTION

A hydraulic tensioner according to one aspect of the present invention includes a housing having a central bore that opens at one end thereof a hollow plunger slidably received in the bore of the housing, the plunger having an inside space that defines a fluid chamber with the bore and also contains rack teeth that are formed on a portion of the outer circumference of the plunger. A first biasing member biases the plunger in a protruding direction. A ratchet member provided slidably in a ratchet hole extending in an inclined direction that intersects an axis of the plunger is also present. The ratchet member has a cylindrical head portion at a distal end to engage the rack teeth, where it is adapted to permit travel of the plunger in a protruding direction but blocks the retraction of the plunger in a backward direction. A second biasing member biases the ratchet member in a direction, such that the rack teeth engage the outer circumferential edge portion of the distal end of the head portion. The second biasing member is a coil spring, one end of which contacts a rear surface side of the head portion of the ratchet member, and the other end of which contacts a plug member of the ratchet hole.

When the plunger of the present invention travels in the protruding direction, the ratchet member slides in the ratchet hole through the head portion in a direction moving away from the rack teeth. When the plunger travels in the backward direction, the outer circumferential edge portion of the head portion of the ratchet member engages the rack teeth, thereby preventing the retraction of the plunger. Since the ratchet mechanism is formed utilizing an outer circumferential edge portion of a simple, easy-to-manufacture, cylindrical shaped head portion without forming a plurality of teeth on the ratchet mechanism, the structure is simplified.

The rack member is slidably supported in a groove formed on an outer circumference of the plunger extending in an axial direction of the plunger. The rack member has a longitudinal length less than the axial length of the groove. In this case, during operation of the tensioner, the difference between the axial length of the groove and the longitudinal length of the rack member acts as a backlash, thereby enlarging the entire backlash. Therefor, a hydraulic tensioner suitable for a chain system having a relatively longer center distance may be achieved.

The housing has a first through hole adapted to insert a disengaging pin thereinto on a distal end side of the head portion in order to disengage engagement of the head portion with the rack teeth. The housing has a second through hole adapted to insert a retaining pin thereinto on a rear end side of the ratchet member in order to retain the plunger in a retracted state. Insertion of the disengaging pin into the first through hole causes the head portion to travel away from the rack teeth, thereby facilitating disengagement of the head portion with the rack teeth. By this disengagement, a worker can easily push the plunger into the housing before transportation of the tensioner. The insertion of the retaining pin into the second through hole prevents travel of the ratchet member in a direction that causes the head portion to move away from the rack teeth, blocking the travel of the plunger in the protruding direction, thereby easily maintaining the retracted condition of the plunger. As a result, assembly of the tensioner into a chain may be conducted with ease. After assembly into the chain, the tensioner is placed in an operatable state by removing the retaining pin.

The disengaging pin and the retaining pin are preferably the same pin with a tapered distal end. In this case, insertion of the pin into the distal end side of the head portion and the rear end side of the ratchet member may be conducted with ease. Also, the use of only one pin as a disengaging pin and a retaining pin decreases the number of components.

A check valve may be provided at a bottom portion of the central bore of the housing to permit fluid flow into the chamber but to block reverse flow of fluid, thereby securely preventing the retraction of the plunger.

DETAILED DESCRIPTION OF THE INVENTION

Figure 1:
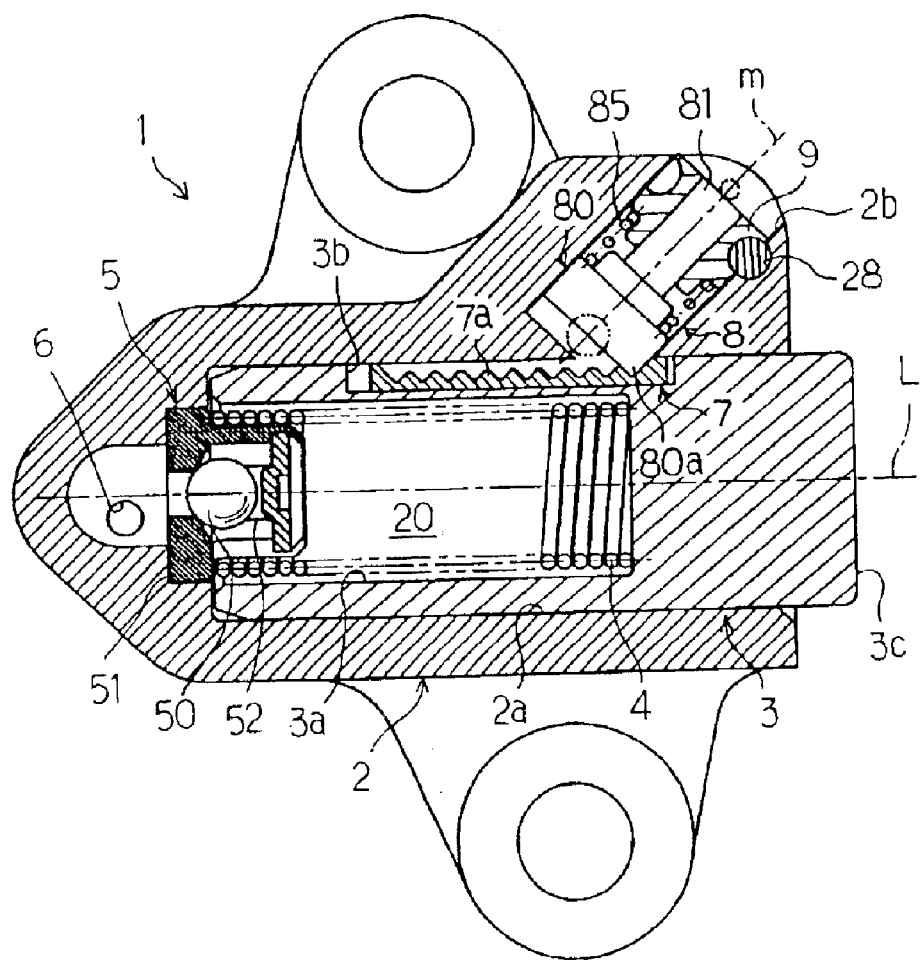
FIG. 1 shows a longitudinal sectional view of a hydraulic tensioner according to an embodiment of the present invention.

As shown in FIG. 1, a hydraulic tensioner 1 includes a housing 2, a hollow plunger 3 fitted slidably in a bore 2a formed in the housing 2, and a spring 4 as a first biasing member that biases the hollow plunger 3 in a protruding direction from the bore 2.

In the housing 2, a fluid chamber 20 is defined by an inner space 3a formed in the plunger 3 and an inside wall surface of the bore 2a. A check valve 5 is provided at a bottom portion of the bore 2a in the housing 2 to permit the flow of fluid into the chamber 20 but to block the flow of fluid in a reverse direction. The check valve 5 is comprised of a ball 50, a ball seat 51 contacted by the ball 50, and a ball spring 52 biasing the ball 50 against the ball seat 51. Any other suitable structure may be employed to form a check valve. The housing 2 also has a fluid passage 6 to connect the chamber 20 with an outer source of pressurized fluid (not shown).

An axially extending groove 3b is formed on a portion of the outer circumference of the plunger 3. The groove 3b houses a rack member 7 with rack teeth 7a. The longitudinal length of the rack member 7 is less than that of the groove 3b. The rack member 7 is slidably supported in the axial direction of the groove 3b.

Figure 2:
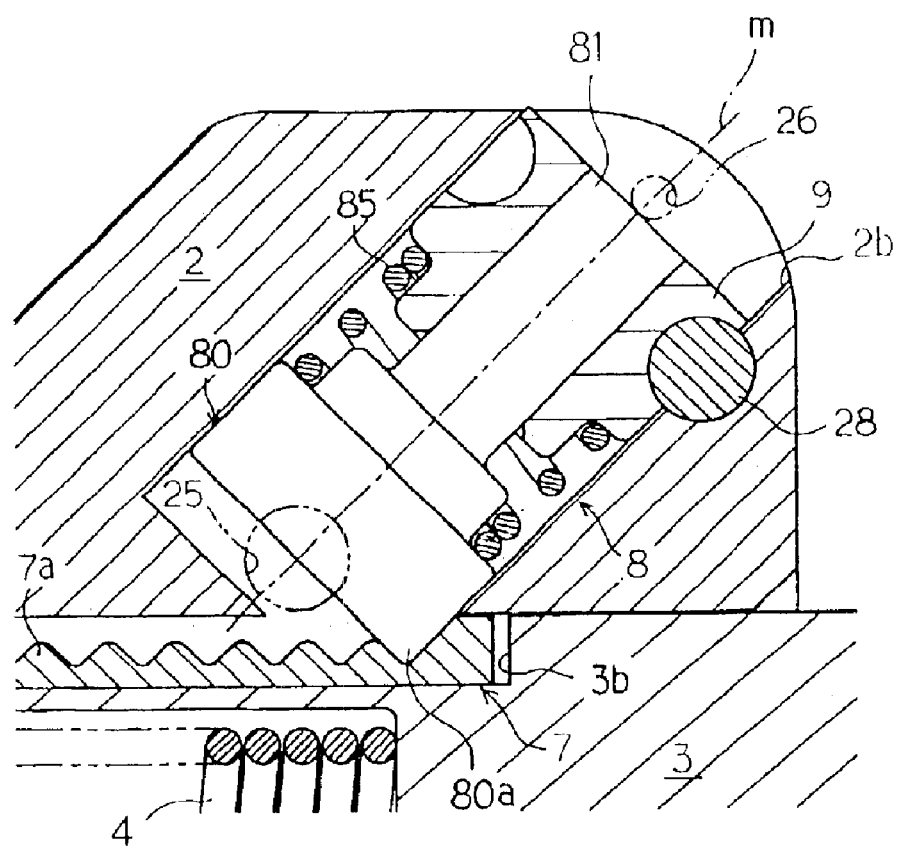
FIG. 2 shows an enlarged view of a ratchet mechanism of the hydraulic tensioner of FIG. 1.

A ratchet hole 2b is formed in the housing. 2. A centerline m of the ratchet hole 2b intersects an axial centerline L of the plunger 3 diagonally. The angle between the centerlines m and L is predetermined to be about 45 degrees, but the angle is suitably selected from the range of approximately 30 to 60 degrees in accordance with the application of the tensioner. In the ratchet hole 2b, a ratchet member 8 is provided. The ratchet member 8, as shown in FIG. 2, is a cylindrical head portion 80 with a shaft portion 81 extending on the backside of the head portion 80. The head portion 80 is slidably supported in the ratchet hole 2b. Fixedly attached through pins 28 in the open portion of the ratchet hole 2b is plug member 9. The shaft portion 81 of the ratchet member 8 is slidable in a central through hole of the plug member 9.

Between the plug member 9 and the head portion 80 is provided a coil spring 85 in the compressed state, which acts as a second biasing member. One end of the coil spring 85 presses against the back surface of the head portion 80, and the other end presses against the plug member 9. The resilient force of the coil spring 85 biases the ratchet member 8 in such a way that the outer circumferential edge portion 80a of the distal end of the head portion 80 engages the rack teeth 7a of the rack member 7.

The rack teeth 7a, ratchet member 8 and coil spring 85 form the ratchet mechanism of an embodiment of the present invention. Such a ratchet mechanism permits the travel of the plunger 3 in a protruding direction (i.e. righthand direction of FIG. 1), and prevents the retraction of the plunger 3 in a backward direction by interlocking the outer circumference of the head portion 80 of the ratchet member 8 between the rack teeth 7a and the ratchet hole 2b. Furthermore, in the assembly of the tensioner, a worker has only to integrate the ratchet member 8, coil spring 85 and plug member 9, and put them into the ratchet hole 2b, the assembly of the tensioner can be conducted with ease.

As shown in FIG. 2, the housing 2 has a first and second through hole 25, 26 formed therein to penetrate the outer circumference of the housing 2 in a direction perpendicular to the axial direction (i.e. the direction perpendicular to the page of FIG. 2). The first through hole 25 opens in the vicinity of the head portion 80 of the ratchet portion 8 and the second through hole 26 opens in the vicinity of the rear end of the shaft portion 81 of the ratchet member 8.

Figure 3:
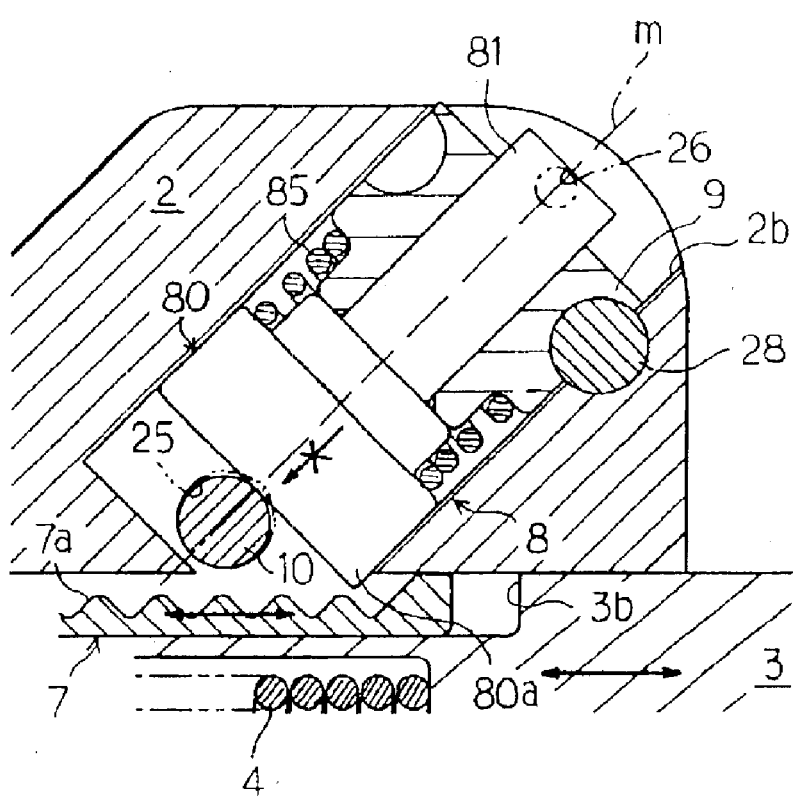
FIG. 3 shows a detail illustrating a ratchet mechanism and a disengaging pin.
Figure 4:
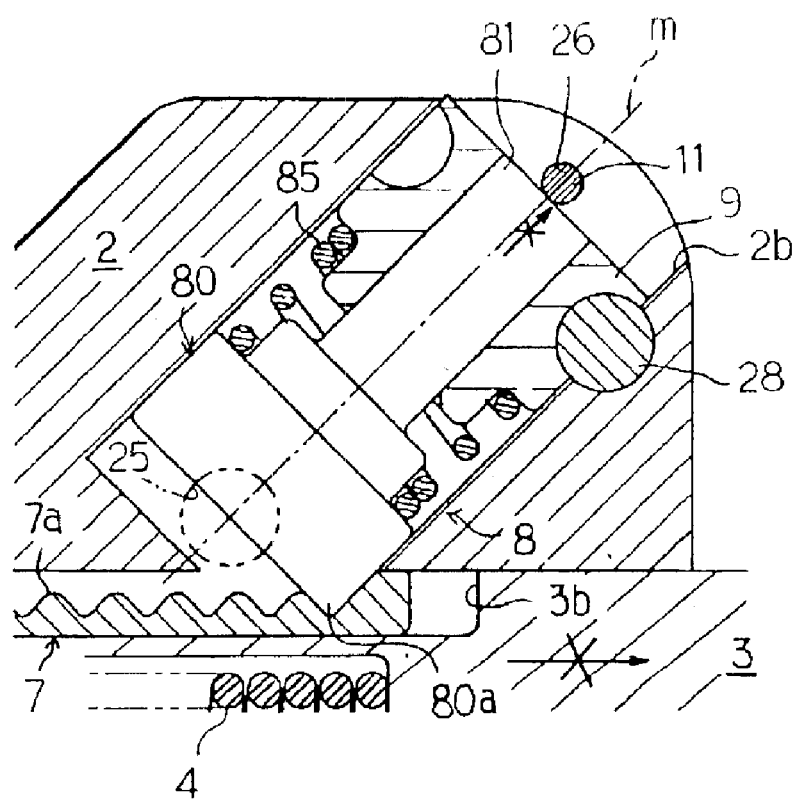
FIG. 4 shows a detail illustrating a ratchet mechanism and a retaining pin.

The first through hole 25, shown in FIG. 3, is for insertion of a disengaging pin 10 to disengage engagement between the head portion 80 of the ratchet member 8 and the rack teeth 7a of the rack member 7. The second through hole 26, shown in FIG. 4, is adapted for insertion of the retaining pin 11, which maintains the plunger 3 in a retracted state. Both the disengaging 10 and retaining 11 pins have tapered distal ends. In an alternative embodiment, a single, common pin may be provided for the disengaging pin 10 and the retaining pin 11, thus reducing the number of components of the tensioner 1.

Figure 5:
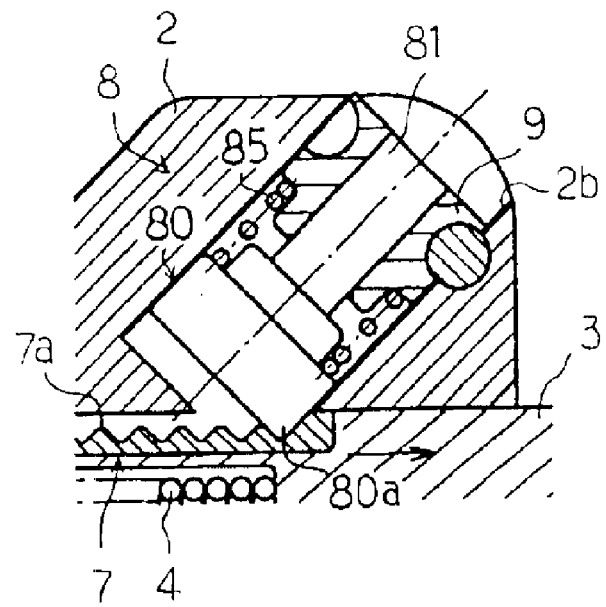
FIG. 5 shows a detail illustrating an operation of the ratchet mechanism at the time of protrusion of the plunger.
Figure 6:
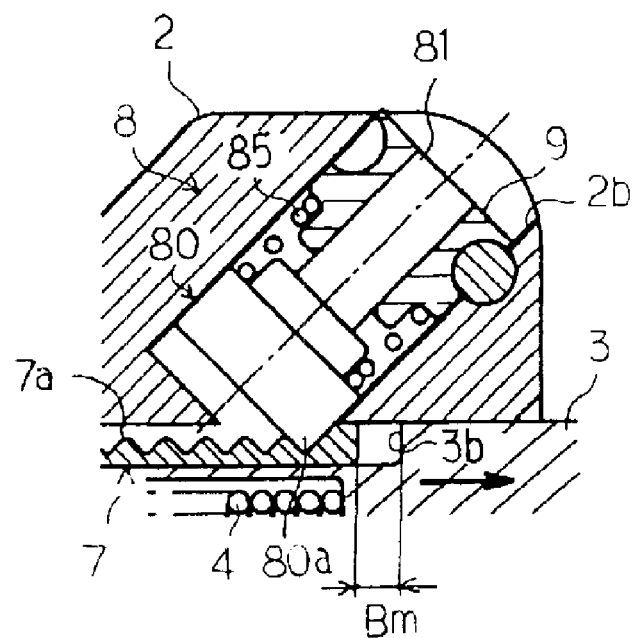
FIG. 6 shows a detail illustrating an operation of the ratchet mechanism at the time of protrusion of the plunger.

As the plunger 3 starts to move in a protruding direction from the maximum retracted state where the outer circumferential edge portion 80a of the head portion 80 of the ratchet member 8 engages with the rack teeth 7a of the rack member 7, shown in FIG. 5, only the plunger 3 travels in a protruding direction while the engaging state between the head portion 80 and the rack teeth 7a maintained, as shown in FIG. 6.

Thereby, a clearance Bm occurs between a side wall of the groove 3b of the plunger 3 and a front end surface of the rack member 7.

Figure 7:
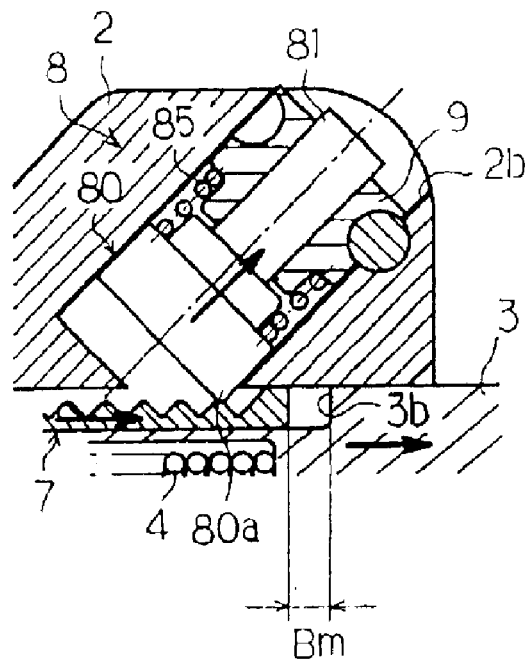
FIG. 7 is a detail illustrating an operation of the ratchet mechanism at the time of protrusion of the plunger.

As the plunger 3 moves further in the protruding direction, as shown in FIG. 7, the outer circumferential edge portion 80a of the distal end of the head portion 80 starts to ride on the rack teeth 7a, and thus, the ratchet member 8 travels in the direction marked by the arrow, in the ratchet hole 2b against the resilient force of the coil spring 85.

Figure 8:
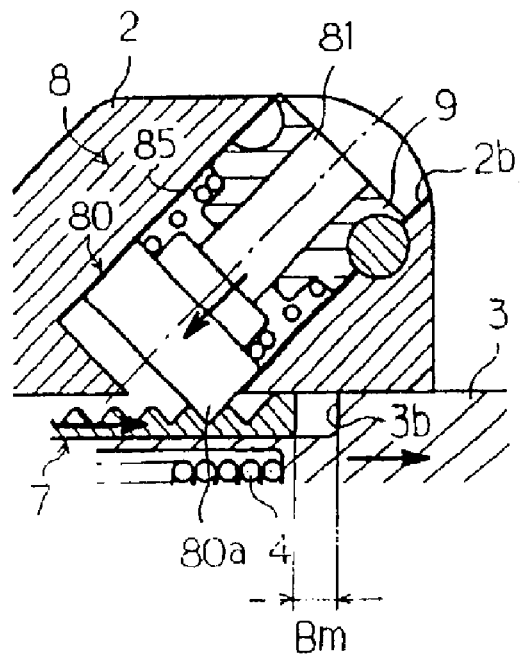
FIG. 8 is a detail illustrating an operation of the ratchet mechanism at the time of protrusion of the plunger.

When the plunger 3 further travels, as shown in FIG. 8, the outer circumferential portion 80a of the head portion 80 passes over the ridge of the rack teeth 7a. Then, the rack member 8 moves toward the rack member 7 urged by the resilient force of the coil spring 85, and the outer circumferential edge portion 80a of the head portion 80 engages the next rack teeth 7a. Additionally, in the case of further movement of the plunger 3 in the protruding direction, the action shown in FIGS. 6 to 8 is conducted repeatedly.

When tension in the chain increases and a compressive force acts upon the distal end portion 3c of the plunger 3, the ball check valve 6 closes and hydraulic pressure in the chamber 20 is imparted upon the plunger 3 as a resistant force, thereby preventing the backward movement of the plunger 3.

Figure 9:
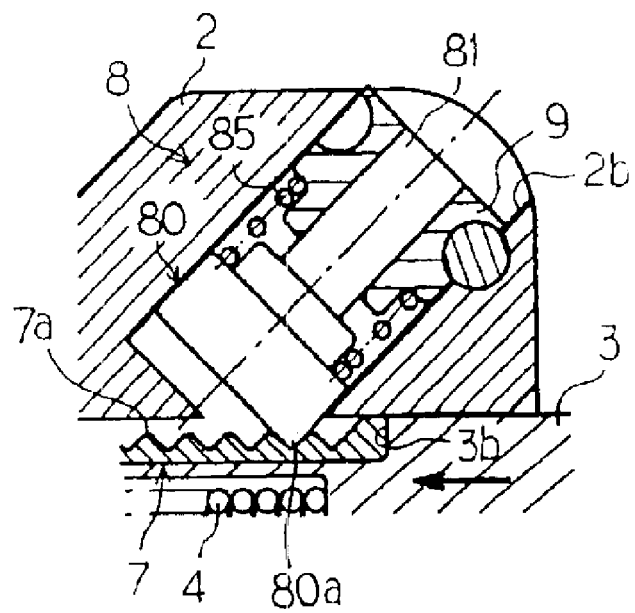
FIG. 9 is a detail illustrating an operation of the ratchet mechanism at the time of retraction of the plunger.
Figure 10:
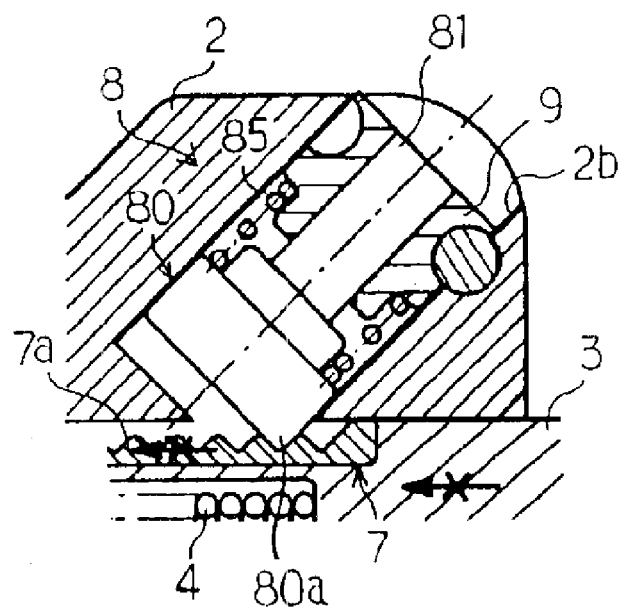
FIG. 10 is a detail illustrating an operation of the ratchet mechanism at the time of retraction of the plunger.

At the time of backward movement of the plunger 3, as shown in FIG. 9, only the plunger 3 retracts a clearance Bm with engagement between the outer circumferential edge portion 80a of the head portion 80 of the ratchet member 8 and the rack teeth 7a of the 20 rack member 7 maintained. When the side wall of the groove 3b of the plunger 3 contacts the front end surface of the rack member 7, as shown in FIG. 10, the outer circumferential edge portion 80a of the head portion 80 is interlocked between the rack teeth 7a and the inner circumferential surface of the ratchet hole 2b, thereby securely preventing the rearward movement of the plunger 3.

In this case, a ratchet member is composed utilizing a simple, easy-to-manufacture cylindrical shaped head portion 80 without providing a plurality of teeth on a ratchet member, which simplifies the whole structure. Also, an axial clearance Bm between the groove 3b of the plunger 3 and the rack member 7 acts as a backlash of the tensioner, thereby increasing the entire backlash, suitable for a chain system with a relatively longer center distance.

The plunger is in the retracted state when the head portion 80 of the ratchet member 8 and the rack teeth 7a are disengaged from each other, such as at the time of transportation or installation of the tensioner, as shown in FIG. 3. The disengaging pin 10 is inserted into the first through hole 25 formed in the housing 2. Thus, engagement between the outer circumferential portion 80a of the head portion 80 of the ratchet member 8 and the rack teeth 7a is disengaged. From this condition, by pushing the plunger 3 into the housing, the plunger 3 can be easily placed in a retracted state.

Then, with the distal end portion 3c of the plunger 3 pressed so as not to protrude the plunger 3, the disengaging pin 10 is extracted from the first through hole 25 and the retaining pin 11 is inserted into the second through hole 26 formed in the housing, as shown in FIG. 4. Thereby, the outer circumferential edge portion 80a of the head portion 80 of the ratchet member 8 and the rack teeth 7a are re-engaged, thus maintaining the retracted state of the plunger 3.

After the tensioner is installed into the chain, the tensioner is placed in an operatable condition by extracting the retaining pin 11 from the second through hole 26.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for applying tension to a chain comprising:

a housing having a bore open at one end;

a hollow plunger with an outer circumference slidably received in the bore of the housing, having an inner space defining a fluid chamber with the bore and an axially extending groove formed as part of the outer circumference of the plunger;

a first biasing member biasing the plunger in a protruding direction;

a rack member formed with rack teeth, slidably supported in the axially extending groove, such that the rack member has a longitudinal length less than an axial length of the groove; and a ratchet member, sliding in a ratchet holes, having an axis extending in an inclined direction and intersecting an axis of the plunger, the ratchet member having a cylindrical head portion with an outer circumferential edge portion at its distal end, such that the outer circumferential edge portion of the cylindrical head portion engages the rack teeth, the engagement of the outer circumferential edge portion of the ratchet member with the rack teeth permitting travel of the plunger in a protruding direction but blocking retraction of the plunger in a backward direction;

a second biasing member biasing the ratchet member in an engaging direction of the rack teeth with the distal end of the cylindrical head portion.

2. The hydraulic tensioner according to claim 1, wherein the second biasing member is a coil spring and one end of the coil spring contacts a rear surface side of the cylindrical head portion and the other end of the coil spring contacts a plug member adapted to be fixed at an open portion of the ratchet hole.

3. The hydraulic tensioner according to claim 1, wherein the housing has a first and second through hole formed thereinto, the first through hole being provided to insert an unlocking pin into a distal end side of the head portion to unlock locking condition between the head portion and the rack teeth, the second through hole being provided to insert a retaining pin into a rear end side of the ratchet member to maintain the plunger at its retracted condition.

4. The hydraulic tensioner according to claim 3, wherein the unlocking pin and the retaining pin are a common pin having a tapered distal end.

5. The hydraulic tensioner according to claim 1, wherein a check valve is provided at a bottom portion of the bore of the housing to permit fluid flow into the fluid chamber but to block fluid flow in a reverse direction.

* * * * *